No. 626,967. Patented June 13, 1899.
W. COOK.
TRANSMISSION GEAR FOR MOTOR VEHICLES.
(Application filed Mar. 7, 1899.)
(No Model.) 3 Sheets—Sheet 1.

No. 626,967. Patented June 13, 1899.
W. COOK.
TRANSMISSION GEAR FOR MOTOR VEHICLES.
(Application filed Mar. 7, 1899.)
(No Model.) 3 Sheets—Sheet 2.

Witnesses
Inventor
William Cook

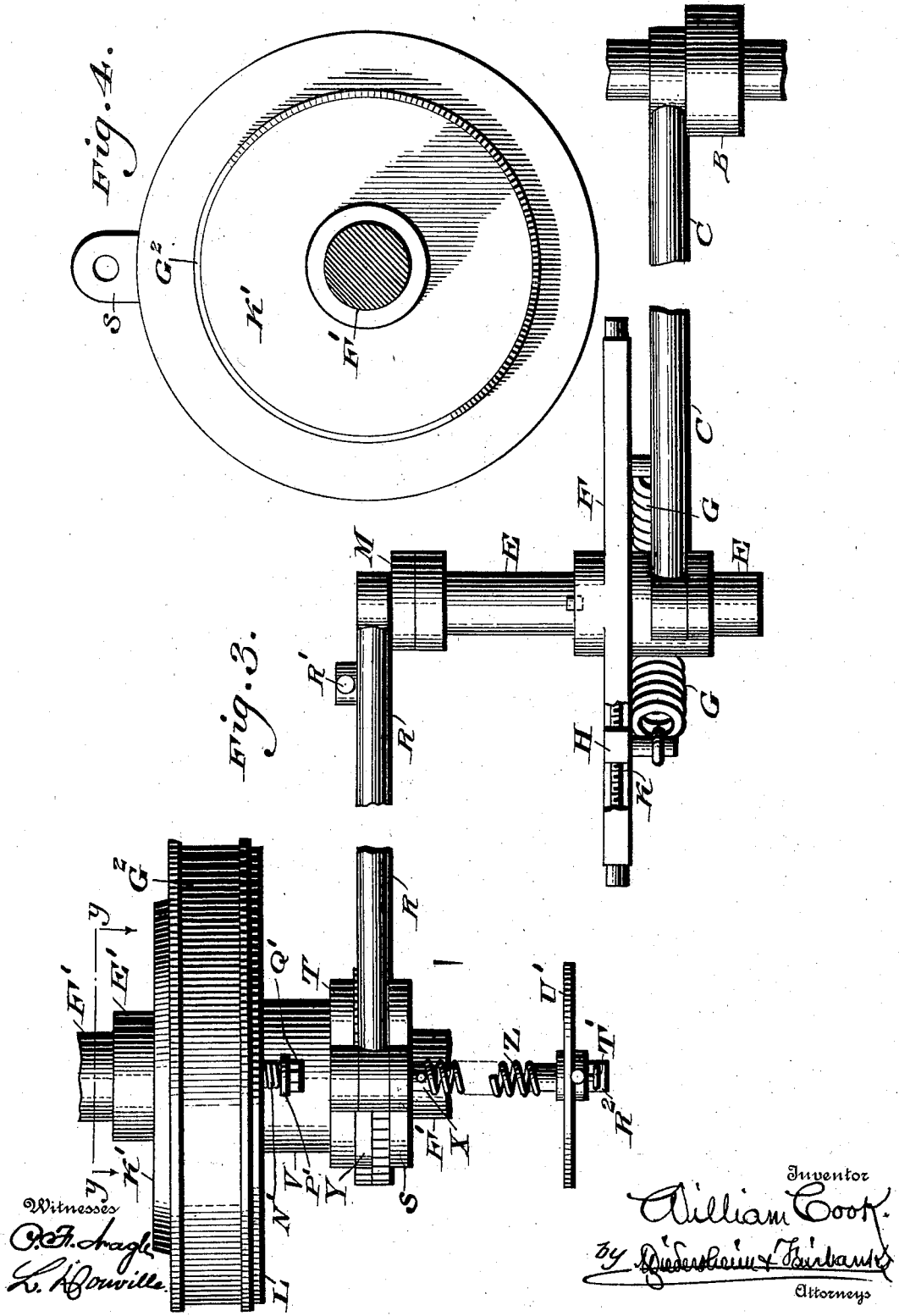

UNITED STATES PATENT OFFICE.

WILLIAM COOK, OF PHILADELPHIA, PENNSYLVANIA.

TRANSMISSION-GEAR FOR MOTOR-VEHICLES.

SPECIFICATION forming part of Letters Patent No. 626,967, dated June 13, 1899.

Application filed March 7, 1899. Serial No. 708,062. (No model.)

*To all whom it may concern:*

Be it known that I, WILLIAM COOK, a citizen of the United States, residing in the city and county of Philadelphia, State of Pennsylvania, have invented a new and useful Improvement in Transmission-Gears for Motor-Vehicles, which improvement is fully set forth in the following specification and accompanying drawings.

My invention consists of a novel gear for transmitting the power of a motor to the wheels of a vehicle and admitting of either wheel to have motion independent of the other when the vehicle is turning a corner or making a curve, when either wheel may slip and move at a velocity to suit the radius of the circle it describes without being controlled or restrained by the other wheel.

Figure 1:
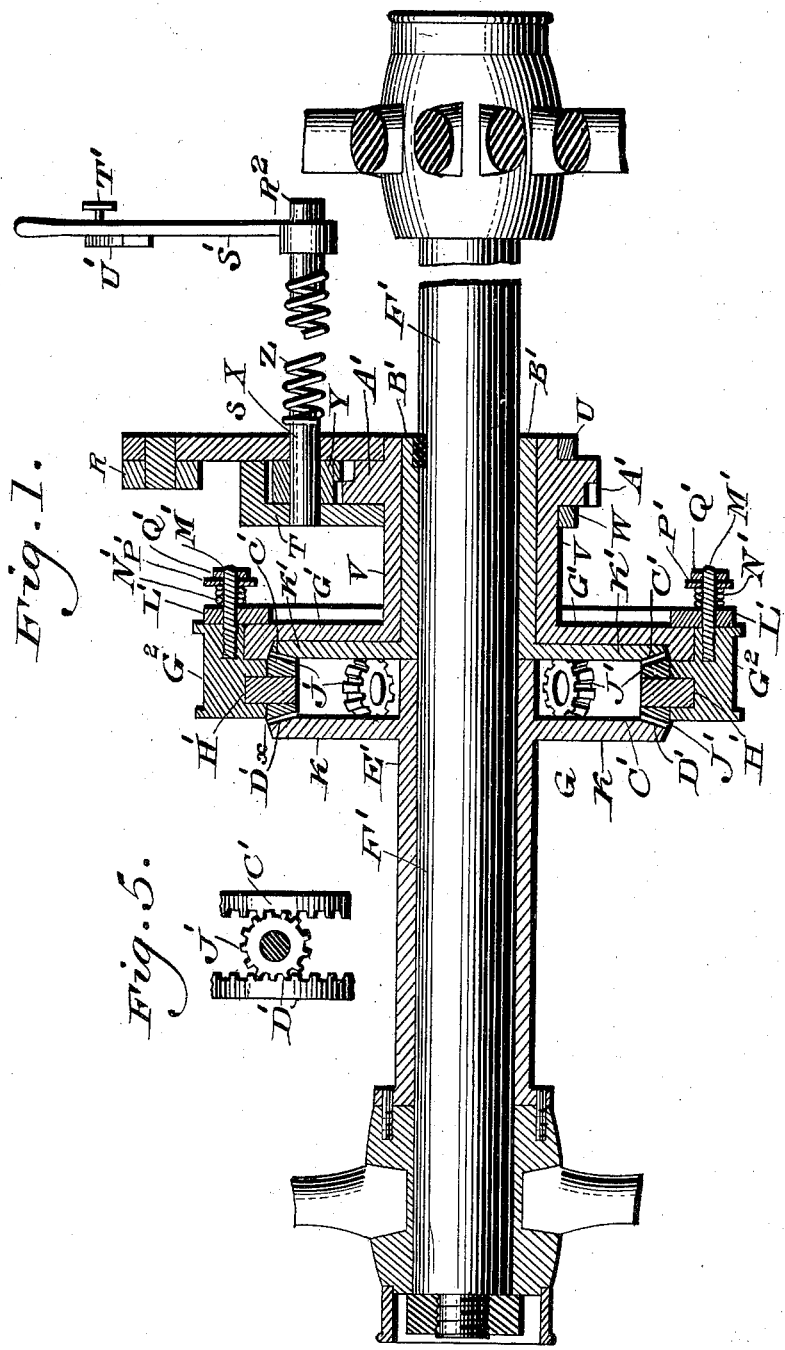
Figure 2:
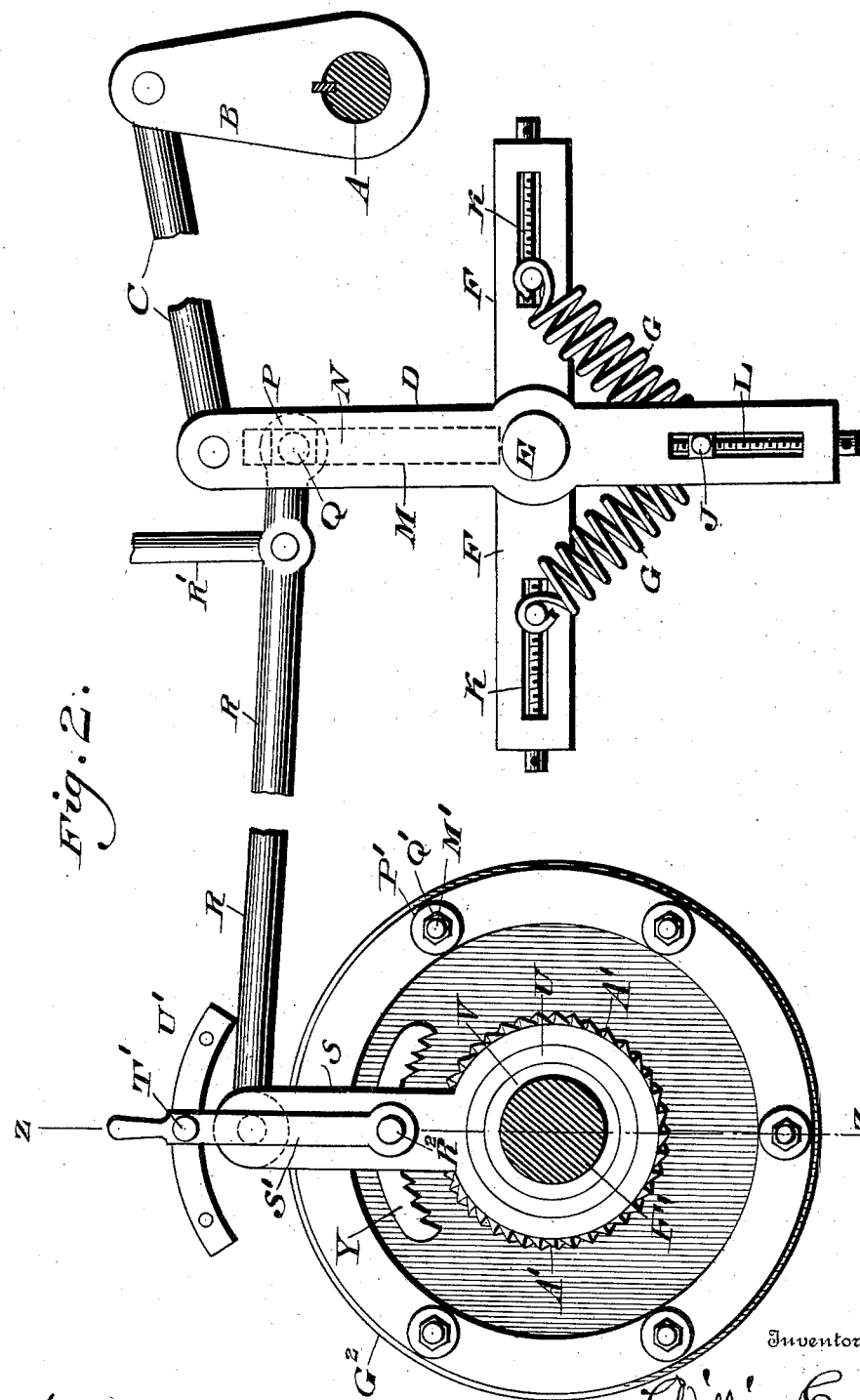

Figure 1 represents a vertical section of a transmission-gear embodying my invention, including portion of a vehicle to which it is applied. Fig. 2 represents a partial side elevation thereof and partial vertical section thereof on an enlarged scale. Fig. 3 represents a top or plan view thereof on an enlarged scale. Fig. 4 represents a partial side elevation thereof and partial vertical section thereof on line $y\,y$, Fig. 3. Fig. 5 represents a section of a portion on line $x\,x$, Fig. 1.

Similar letters of reference indicate corresponding parts in the figures.

Referring to the drawings, A designates the shaft, to which the power of a motor on the vehicle is imparted.

B designates a crank-arm which is keyed or otherwise secured to said shaft and has pivotally connected with it one end of the rod C, whose other end is pivotally connected with the rocking arms D, which are freely mounted on the shaft E, the latter having its bearings on the vehicle. Keyed or otherwise firmly secured to said shaft E are the rocking arms F, to which are attached the springs G G, which are also attached to the arms D, it being noticed that said arms D and F are provided with nuts H J and screws K L, the springs being attached to said nuts, whereby by the proper rotation of said screws, which are mounted on the arms and engage said nuts, they serve to adjust the tension of the springs.

Secured to the shaft E is the rocking arm M, which is provided with the longitudinal slot N, (shown in dotted lines, Fig. 2,) said slot receiving the block P, on which is the pivot Q of the rod R, the latter being provided with an arm R′, whereby said rod may be raised or lowered on the rocking arm M, so as to adjust the throw of said rod R, and consequently of the reciprocating lever S to which it is pivoted, said lever having connected with it the arm T and being provided with the boss U, which freely encircles the sleeve V, said arm T being provided with the boss W, which also freely encircles said sleeve.

Mounted on the lever S and arm T is the rock-shaft X, which carries the double-winged pawl Y, adjacent to which is the ratchet A′, which is secured to the periphery of the sleeve V, it being noticed that said ratchet has two rows of teeth pitched, respectively, in opposite directions, the teeth of the pawl Z being also reversely pitched at the opposite wings or ends thereof.

The sleeve V freely encircles the hub B′ of the bevel-gear C′, opposite to which is the bevel-gear D′, which is provided with the hub or sleeve E′, which fully encircles the axle F′, it being noticed that one wheel of the vehicle is secured to said axle F′ and the other wheel is secured to the sleeve E′ as its axle, said sleeve being sustained by the portion of the axle F′ extended into the same, the wheels thus being carried by the sections of a divided shaft or axle.

On the inner end of the sleeve V is the ring G′, whose periphery is clamped to the rim G², on whose inner face is the inwardly-projecting stud H′, on which is mounted the bevel-pinion J′, which meshes with the bevel teeth or gears C′ D′ on the inner side of the peripheral portions of the pinions K′ and K, said pinions being formed with or otherwise secured to the hub B′ and sleeve E′, respectively.

In order to secure the ring G′ to the rim G², I employ the annulus L′, the studs M′, the springs N′, the washers P′, and nuts Q′, said studs passing through said annulus and rim and said springs being interposed between said washers and annulus, the washer being retained in position by the nuts Q′ on the outer end of the studs, thus forming a slip-joint for said rim and the sleeve V.

The shaft X, which carries the double-ended pawl Y, has secured to it the coil-spring Z, whose outer end is connected with the stud R² of the hand-lever S', the latter carrying the pin or screw T', which is adapted to enter either of the openings of the segment U', whereby when the lever is rotated the spring Z acts by torsion to turn the pawl Y into contact with either row of teeth of the ratchet A' relatively to the direction the vehicle is to be propelled forward or backward.

The operation is as follows: As the shaft A rotates its motion is imparted to the crank B, thus oscillating the arms D F M, the rod R, and the arm S, it being noticed that the springs G, which receive motion from the arms D, impart the same to the arms F in an easy and gentle manner, avoiding jerking or severity in the motion of the shaft E. The pawl Y, which is carried by said oscillating arm S, now operates the ratchet A', whereby rotary motion is imparted as one to the sleeve V, the pinion K', the rim G², the pinions J', traveling with said rim, the two gears C' D', the limb B', and the axle F', so that the wheel on the latter is rotated, rotary motion being also imparted to the hollow shaft or sleeve E', and thus to the wheel connected with the latter, whereby the vehicle is propelled. When the vehicle turns a corner or makes a curve or either wheel strikes an obstruction, the wheels may move at different velocities or independent of each other, since either pinion K' or K may rotate without being controlled by the other, and thus there is no strain on either gear, and consequently on the vehicle-wheels.

Should from any cause severe strain be imparted to the rim G², the ring G' may slip therein, thus avoiding fracture of the ratchet A', the pawl Y, and connected parts.

Having thus described my invention, what I claim as new, and desire to secure by Letters Patent, is—

1. In a transmision device for the purpose stated, a hollow shaft formed in sections, an axle in said sections to one of which latter said axle is fixed, the other section being loose on the axle, vehicle-wheels respectively on said axle and the loose section, gears on said sections, a pinion meshing with said gears, a rotatable carrier for said pinion, a sleeve connected with said carrier and freely encircling the adjacent section of the hollow shaft, a ratchet member on said sleeve, a pawl member adapted to engage said ratchet member, an arm freely mounted on said sleeve and supporting said pawl member, and mechanism connected with said support and the motor for oscillating said arm.

2. In a transmission device for the purpose stated, a hollow shaft formed in sections, an axle in said sections, to one of which latter said axle is fixed, the other section being loose on said axle, vehicle-wheels respectively on said axle and the loose section, gears on said sections, a pinion meshing with said gears, a rotatable carrier for said pinion, the same freely encircling the adjacent section of the hollow shaft, a reversely-toothed ratchet connected with said carrier, a double-ended pawl adapted to engage said ratchet, a support for said pawl, means for shifting said pawl, and mechanism connected with said support and the motor employed for reciprocating said support.

3. In a vehicle-motor, a divided shaft, wheels on the sections of said shaft, gears on said sections, a pinion meshing with said gears, a carrier for said pinion, means controlled by a motor for rotating said carrier, and a slip-joint connecting said carrier with an adjacent member of said means.

4. In a vehicle-motor, a reversely-toothed ratchet connected with mechanism of a sectional wheel-shaft, a double-ended pawl adapted to engage said ratchet, an arm carrying said pawl, means controlled by a motor for operating said arm, a spring attached to the shaft of said pawl and an operating-lever secured to said spring.

5. In a vehicle-motor, a motor having mechanism for transmitting the power of the same to a wheel-axle of said vehicle, arms respectively loose and fixed on an intermediate shaft of said mechanism, and springs adapted to connect the loose arm with the fixed arm.

6. In a vehicle-motor, a motor having mechanism for transmitting the power of the same to a wheel-axle of said vehicle, arms respectively loose and fixed on an intermediate shaft of said mechanism, a spring adapted to connect the loose arm with the fixed arm, and means for adjusting the tension of said spring.

WILLIAM COOK.

Witnesses:
F. H. HESSLER,
J. A. MACKINNON, Jr.